C. A. BETTINGTON.
STEAM BOILER.
APPLICATION FILED JUNE 19, 1906.

973,468.

Patented Oct. 25, 1910.
7 SHEETS—SHEET 2.

C. A. BETTINGTON.
STEAM BOILER.
APPLICATION FILED JUNE 19, 1906.

973,468.

Patented Oct. 25, 1910.
7 SHEETS—SHEET 3.

C. A. BETTINGTON.
STEAM BOILER.
APPLICATION FILED JUNE 19, 1906.

973,468.

Patented Oct. 25, 1910

Witnesses:

INVENTOR
Claude Admiral Bettington
BY
ATTORNEYS

C. A. BETTINGTON.
STEAM BOILER.
APPLICATION FILED JUNE 19, 1906.

973,468.

Patented Oct. 25, 1910.
7 SHEETS—SHEET 7.

INVENTOR
Claude Albemarle Bettington
BY
Seymour Seymour & McGrath
ATTORNEYS

UNITED STATES PATENT OFFICE.

CLAUDE A. BETTINGTON, OF JOHANNESBURG, TRANSVAAL.

STEAM-BOILER.

973,468.      Specification of Letters Patent.     Patented Oct. 25, 1910.

Application filed June 19, 1906. Serial No. 322,484.

*To all whom it may concern:*

Be it known that I, CLAUDE ALBEMARLE BETTINGTON, a lieutenant in the British army, domiciled at Johannesburg, in the Transvaal Colony, in South Africa, but temporarily residing in Boston, in the county of Suffolk and State of Massachusetts, have invented certain new and useful Improvements in Steam-Boilers, of which this instrument is a specification.

My invention relates to boilers for generating steam ordinarily under pressure, preferably from water distributed in small spaces connected with each other and with the steam space, which may be constructed of detachable parts and in sections, looking toward the production of steam at as high pressures as can be employed, with economy in the distribution of material and high efficiency of fuel.

The objects of my invention are to secure the greatest transfer of heat from the products of combustion to the water, the lowest volume of water and of flue gases, the keeping down of the furnace temperature by the immediate transfer of heat from the burning gases before combustion is complete, to provide full tubes of water only at the temperature of the steam in the boiler at those points where the highest temperatures are met, and to secure free and efficient circulation throughout the boiler, and by the more rapid and thorough circulation of the water to provide greater facility for the separation of the steam and water, to obtain drier steam at all rates of evaporation without superheating, to arrange the circulation of both the water and furnace gases so that longer and smaller tubes may be safely used without risk of burning, to provide against loss of heat by radiation, by conduction, and by the outgoing of the flue gases in large volume at high temperatures, to obtain rapid steaming and forcing without danger, to provide a boiler without large reservoirs of water not available for evaporation, to provide for the evaporation of the greater part of the contained water before the destruction of any part would occur from overheating, to obtain reduction of weight and greater compactness with less liability to explosion and less danger should a rupture occur, to eliminate curved tubes and yet secure greater freedom for the expansion and contraction of the different parts, the protection of joints from high temperatures, to provide headers of simple construction and greater strength and lower cost, and to prevent fouling of the tubes, both externally and internally; to make all parts accessible, independent, easily detachable, and in removable sections, to provide greater facilities for cleaning, repairing, reassembling, and renewing, by providing a construction requiring less time for stripping the boiler, to provide for temporary increase of combustion, ordinarily limited in other constructions by the grate area, so that the boiler may be forced greatly in excess of the ordinary rating, to obtain great flexibility of construction, and adaptation to widely different systems of firing, and also to all fuels capable of motion or suspension in air, to adapt the structure to economizers and to an air heating or feed-water heating system, to secure prompt steaming in the shortest time in emergencies, whether starting from cold water or from suspended combustion or low combustion, to provide a self supporting boiler, to secure instant transition from the lowest rate of combustion to the highest and the reverse, and to attain perfect combustion without smoke.

Other objects will appear from the description following.

After many years of practical experience with most of the best known types of boilers, all of which have defects peculiar to their respective types, I have in my boiler combined most of their good qualities and eliminated most of their inherent faults, and at the same time added new and improved features which I have discovered and incorporated in this practical and efficient steam generator of great flexibility and simplicity of construction and of relatively light weight and small cost.

I proceed to describe, in connection with the accompanying drawings forming part of this specification, my best construction and a few of its modifications, all illustrating the principles of steam generation and combustion which I have embodied in my invention, and which I describe as applied in water tube boilers having a combustion chamber using pulverulent solid fuel or oil or inflammable gases or all combined; or supplied with hot gases from an ordinary fire; but many other variations and adaptations will suggest themselves to those familiar with the art, all of them within the range of mechanical skill.

A is a continuous steam and water drum, and $a$ and $a'$ are spring bends joining the parts of the drum.

B' and B' are water tubes connected at the bottom with the feed water system and at the top with water tubes $B^2$, and also through down comers $b$ with the steam and water drum A, and at the bottom with steaming water tubes $B^3$ and $B^3$, and at the top with collecting pipes and a receiving pipe, and through them with the steam and water drum A.

$B^4$ and $B^4$ are "Field" water tubes.

$B^5$ is a steam and water chamber.

$b^2$ and $b^2$ are connecting pipes.

$b^3$ and $b^3$ are water tubes.

C is the central combustion chamber.

C' is a furnace.

D is a combined mud drum and water jacket.

E is a wall or column of refractory material.

E' and E' are baffle walls.

$E^2$ is a furnace wall of refractory material.

F is the fuel flue leading from the pulverizer and blower into the combustion chamber at the bottom.

F' is a trap with a slide $f$ and a hand hole $f'$.

G is a combined fuel pulverizer and blower.

H', $H^2$, $H^3$, $H^4$, $H^5$, $H^6$ are headers.

I is a receiving pipe.

K and K are collecting pipes.

L and L are pipe connections with the mud drum.

M and M are feed water pipes.

M' is the feed water inlet.

N and N are channel iron supports.

O and O are blow off pipes and equalizers.

P and P are outgoing flues for the escaping gases.

R is the steam outlet.

S is the encircling air space. S' is a hot air tube leading therefrom toward the blower.

$S^2$ is a cold air inlet.

$S^3$ is a flue gas inlet.

$S^4$ is a gas or fuel inlet.

T is an oil tank. T' is a supply pipe leading therefrom to the oil sprayer $T^2$.

V, V', $V^2$, $V^3$ are dampers.

W and W are spiral deflecting plates.

X is the slag pit.

1 and 1 are stay bolt studs.

2 and 2 are caps.

3 and 3 are triple clamps.

4 and 4 are pipe connections.

5 and 5 are plugs.

My boiler utilizes all the radiant heat from the combining elements or from the standing incandescent parts, a high percentage to heat tending to escape by convection, and all heat tending to escape by conduction, and this I achieve by so arranging the mechanical elements of my boiler that from the central region fiercest heat there is a progressive descent of temperature to the outer inclosures in all directions, and by abstracting heat from the constituent elements that would be liable to fusion or burning out by systematically applying it to the heating of water in adjacent tubes. To this end I employ combustion in any form, but preferably of pulverulent or small size solid fuel or of oil, or of gases injected into the combustion chamber C through the flue F from the combined pulverizer and blower G, or in the case of oil or gas from separate holders, in which combustion chamber the fuel and the supporter of combustion are mingled, preferably in the proportion for perfect combustion, and advantageously as shown in United States Letters Patent to myself and A. M. Robeson jointly, "Furnace for burning pulverized fuel and other substances", No. 817,989, April 17th, 1906.

In all furnaces employing pulverulent fuel and analogous elements of combustion, there is great difficulty in providing refractory material that will endure the high temperatures; and yet the combustion must be continuous and exceedingly rapid,—about a second for each molecule. I seek and employ these high temperatures because they are the conditions under which perfect combustion can be attained, but I keep the temperature down by (1) backing the brickwork against the water tubes, (2) by surrounding or associating the upward current of air and fuel with water tubes, (3) by surrounding the fuel flue by the combined water jacket and mud drum D, and also (4) by the water top formed by the receiving pipe I and the collecting pipes K and K. I may employ also to assist toward this object a mixture of the flue gases with the incoming air and fuel.

Figure 1:
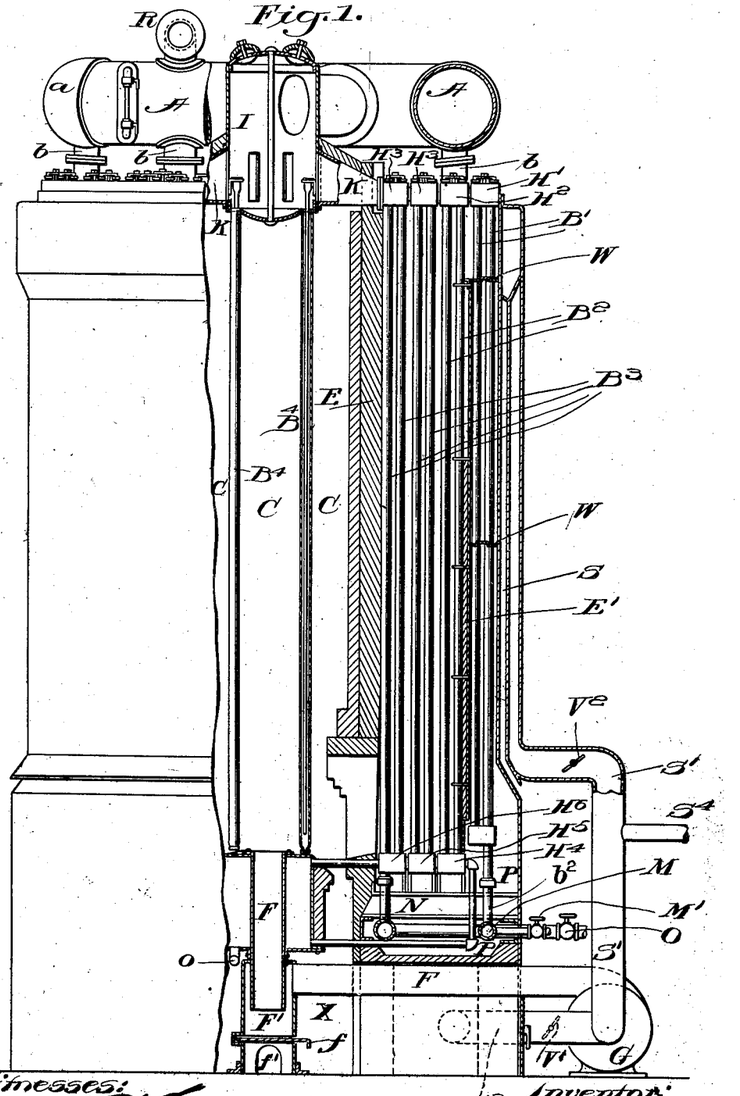
Figure 1 is an elevation of my complete boiler, with feed water economizer and air heater, partly in vertical section, with a combustion chamber suitable for solid lump fuel or equally for pulverulent or liquid or gaseous fuels.
Figure 2:
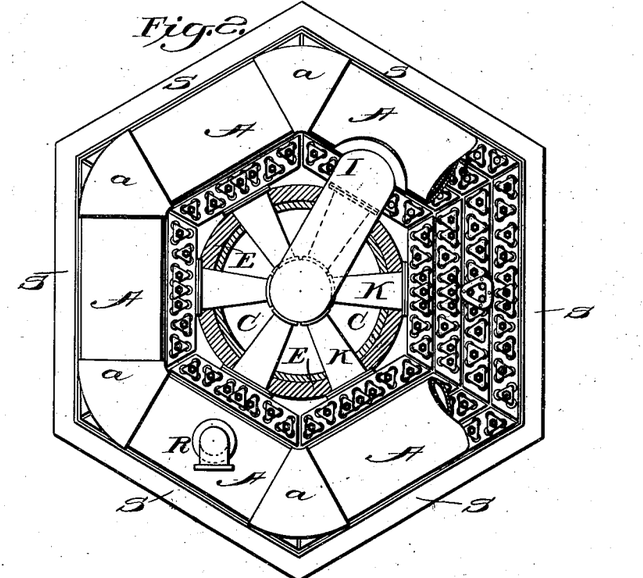
Fig. 2 is a plan of the same showing the continuous steam and water drum and the inner top row of headers for the water tubes, and at the cut away portion showing a complete removable section of the headers for the steam and water tubes.

*Construction of the boiler.*—The continuous steam and water drum A is shown in the drawings, Figs. 1 and 2, as six-sided, made in sections joined by spring bends $a$ and $a$. The water tubes B', B², B³ I arrange preferably also in six sections each containing four double rows, the third of which from the inside is connected with the steam and water drum A by six short downcomers $b$ through the headers H². The outer or fourth double row of tubes receives the feed water from the bottom through the feed water inlet M', and is connected at the top through the headers H' and H² with the third double row of water tubes B², and through the down comers $b$ with the steam and water drum A. At the bottom the header H⁴ is connected with the header H⁵ and that with another header H⁶, so that the downcoming circulating water and steam passes into H⁵, and part of the water only into the header H⁶ and ascends in both headers H⁵ and H⁶ and the water tubes B³ to the top, thence through collecting pipes K into the receiving pipe I and into the steam and water drum A.

Figure 3:
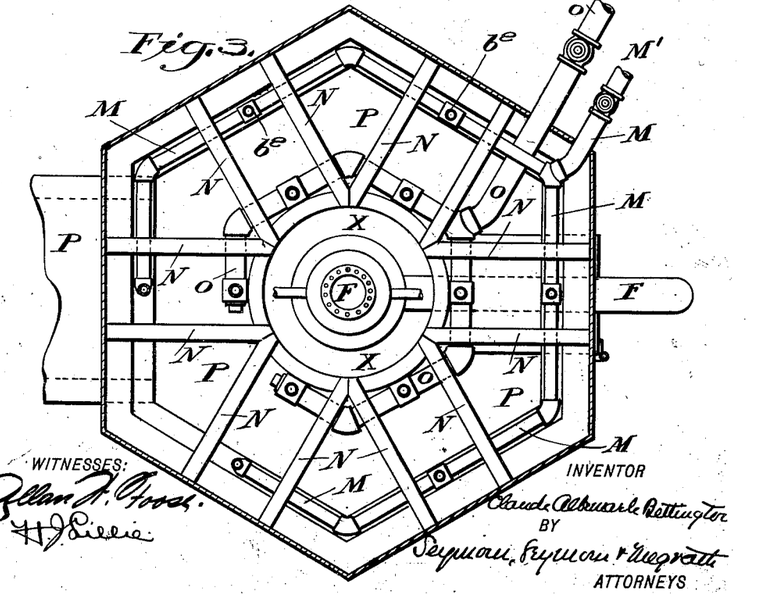
Fig. 3 is a foundation plan showing the fuel pipe and the feed water and blow-off piping system, and channel irons upon which the boiler rests.
Figures 4, 5:
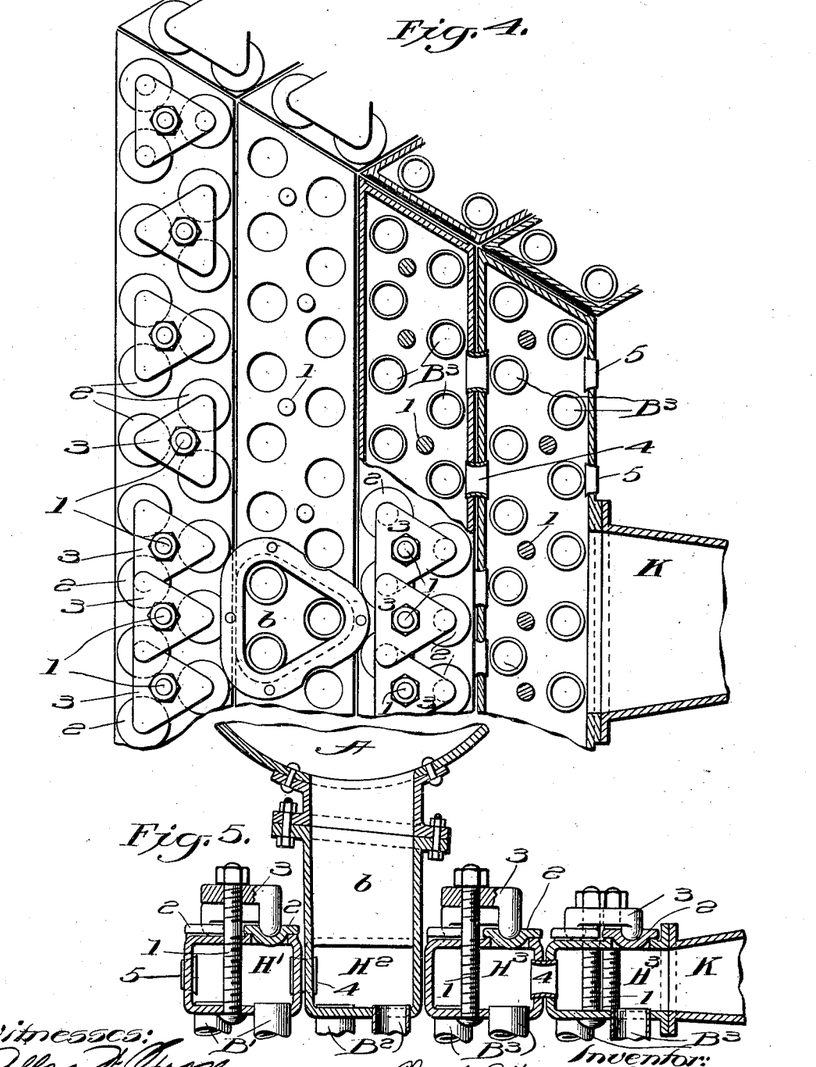
Fig. 4 is a detail of the water tubes, headers and caps.
Fig. 5 is a sectional elevation on the same scale as Fig. 4, both enlarged.
Figure 7:
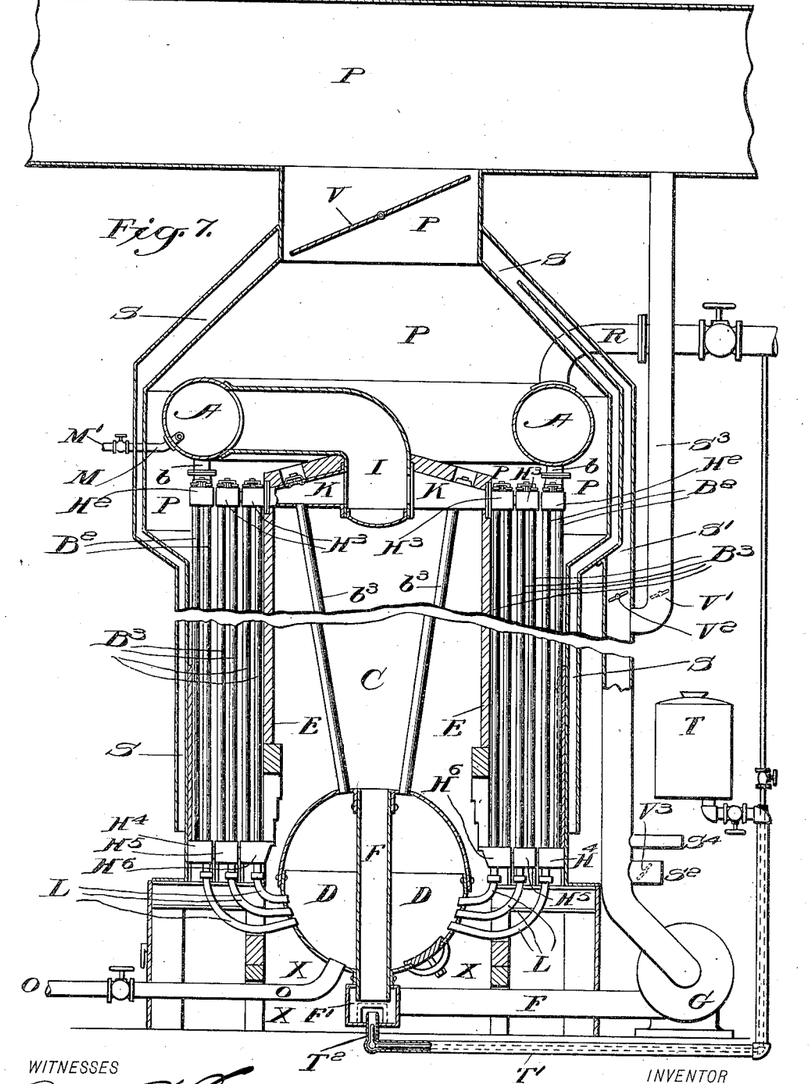
Fig. 7 is another modification of my boiler having a composite brick and water top, a globular mud-drum surrounding the fuel pipe, the furnace containing interior tubes lowering the temperature and without a water economizer, the outer covering forming an air heater, an oil spray burner is also shown.
Figure 8:
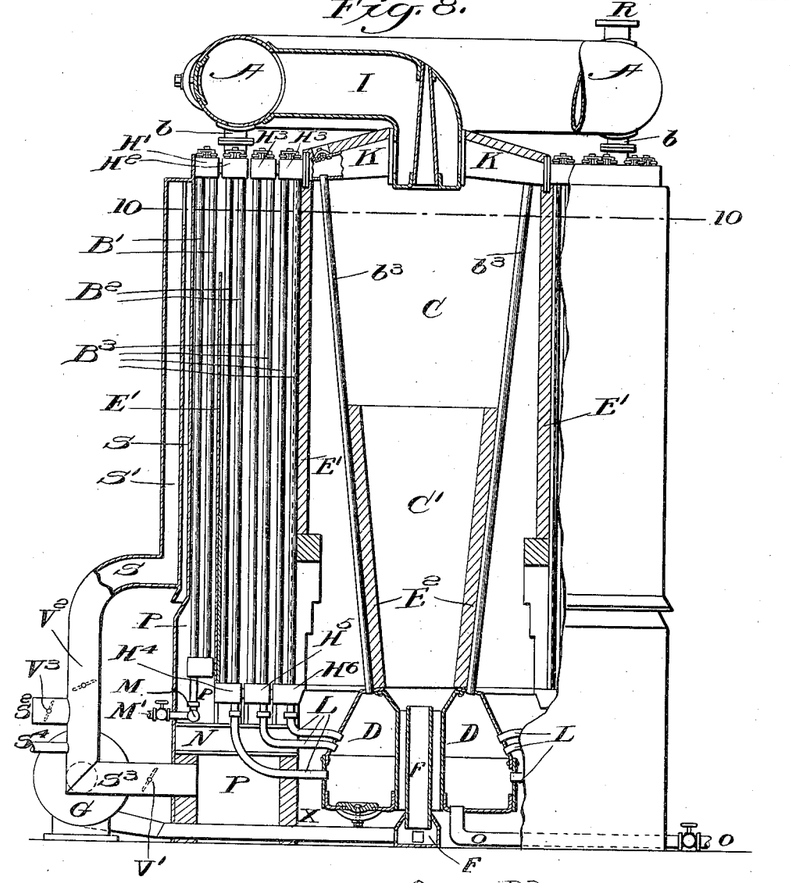
Fig. 8 is another modification showing a special form of furnace.
Figure 9:
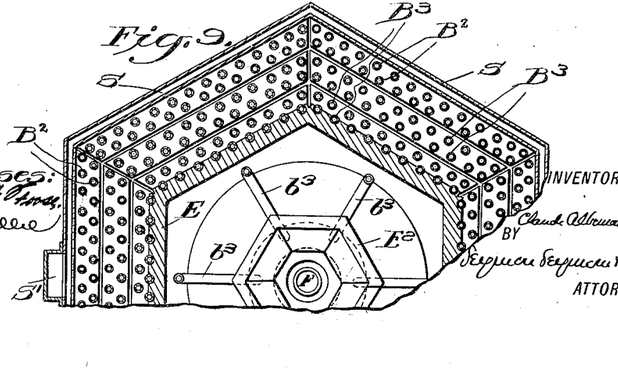
Fig. 9 is a sectional view of the same on line 10—10, but with tubes B' and B omitted.
Figures 10, 11, 12, 13, 14, 15:
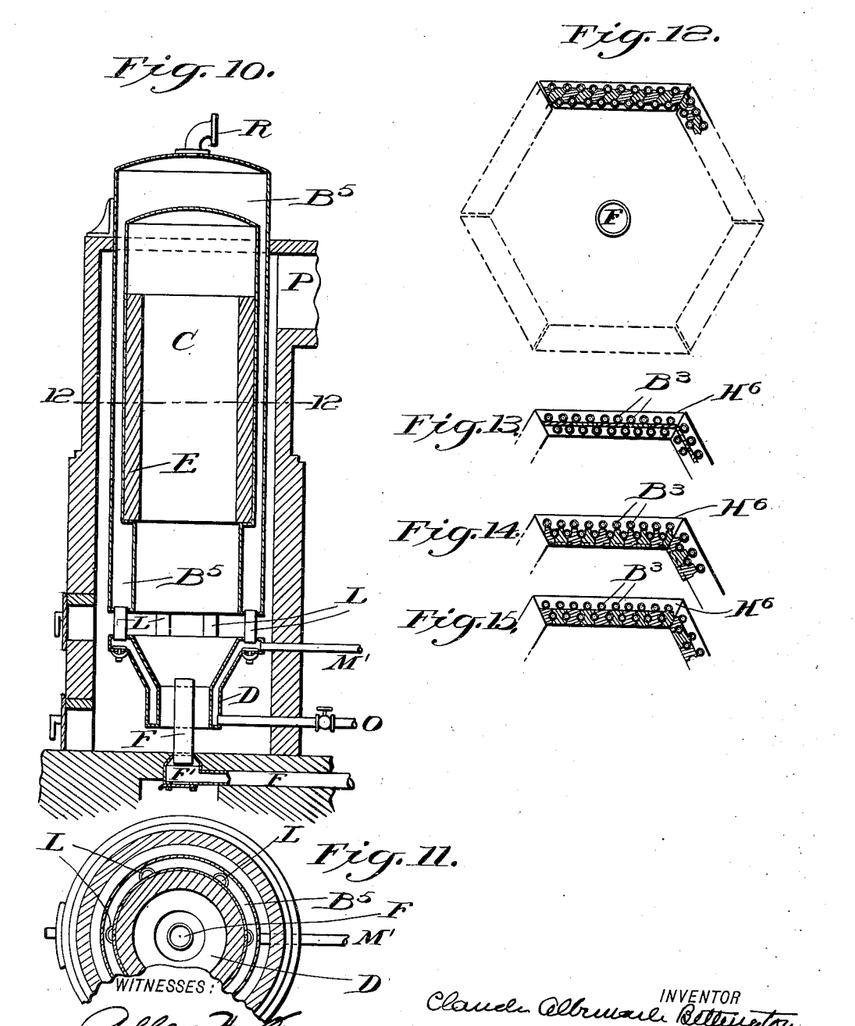
Fig. 10 is a vertical section of my improved boiler in a simple form without mechanical details or accessories.
Fig. 11 is a cross-section on the line 12—12 of Fig. 10.
Figs. 12, 13, 14 and 15 illustrate combinations of water tubes and refractory material, suitably arranged for forming the walls of the combustion chamber.

The feed water pipes M at the bottom, shown in the ground plan, Fig. 3, receive the feed water from any source of supply at M' and distribute it upward through six channels $b^2$, Figs. 1, 3 and 8, one to each of the six sections of water tubes through the outer row of tubes. It also acts as a water equalizer; and so do the pipe connections L and L and mud-drum in Figs. 7 and 8. The blow off pipes O and O are connected through the lower header H⁶ on the inner side of each section of water tubes. The wall E of refractory material, circular or hexagonal in cross-section, or the column as the case may be, protects the adjacent water tubes and is in turn cooled and protected by the water pipes from fusion, and is shown in the drawings composed of two shells, the inner one a lining, and the outer, a thicker retaining wall, or as a lining only as shown in the modifications in Figs. 7, 8 and 9. At the lower end the wall is stepped back so that the liquid slags are dropped in the slag pit X, clear of the opening through which the hot gases pass into the water tube space.

Figure 6:
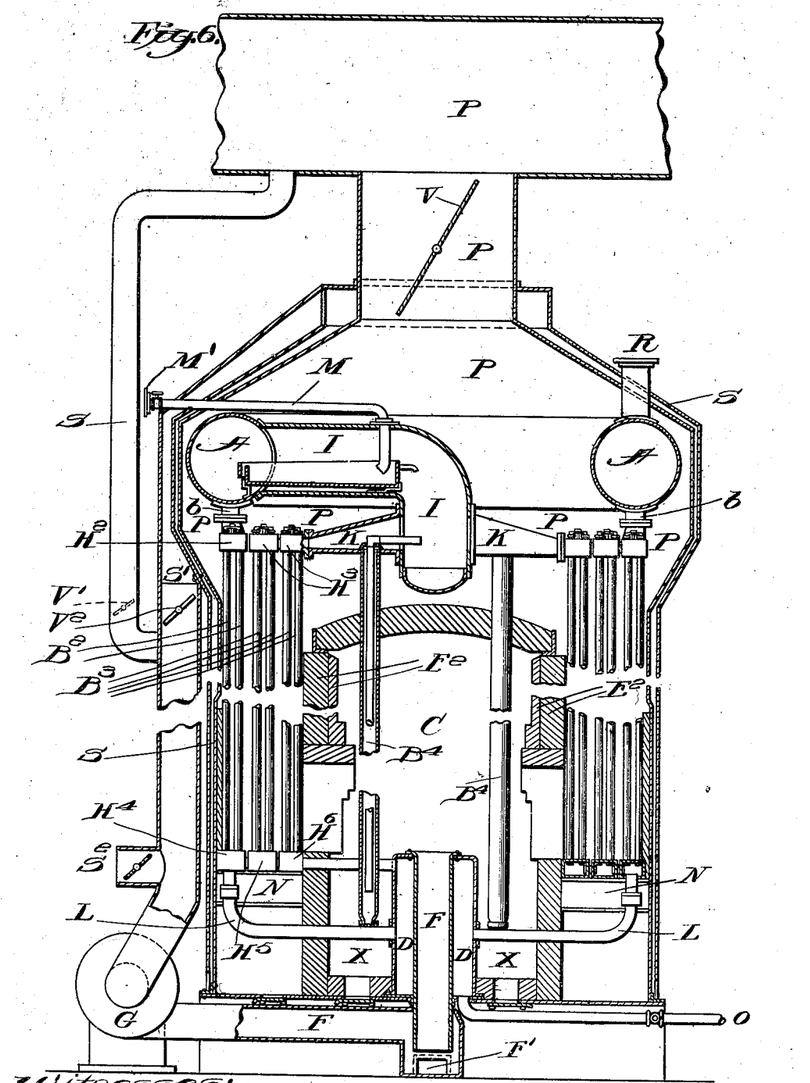
Fig. 6 is a vertical section of a modification of my boiler showing a brick dome top to the combustion chamber instead of the preferred composite top of Fig. 1 and without an economizer, and discharges the gases at the top of the boiler instead of at the bottom.

In Figs. 1 and 6 I have shown "Field" tubes B⁴ and B⁴, suspended from either the receiving pipe I or the collecting pipes K, each containing an inner down take tube open at the bottom for water circulation; but the "Field" tubes may be omitted.

E' and E' are baffle walls built up from the bottom of the furnace between the outer double row of water tubes B' and B', which act as the economizer element, and the next inside double row of water tubes B² called the down-comer elements, and this baffle wall in Fig. 1 is six-sided in cross-section, extends nearly to the top, and this with the wall E of refractory material separates the boiler into three connected chambers, the central combustion chamber C, connecting at the bottom of the walls E with the surrounding concentric chamber, and that connecting at the top with the outer concentric chamber, the latter at the bottom with the outgoing flues P and P leading to the smoke stack; the whole may be surrounded with a concentric outer chamber S for heating the air for combustion.

The composite top is formed of the connecting pipes K with refractory fire brick built in between to form perfect inclosures. The boiler may be inclosed with brickwork or otherwise, but I prefer a metallic sheathing forming an air heater.

The headers at the top are substantially the same in construction as those at the bottom and are provided with caps, stay bolts, studs and triple clamps in the same manner as the upper ones, the lower headers being inverted. Feed water, blow-off and other connections may be screwed directly into any convenient opening in the headers and would not then require clamps. The use of water tubes smaller than usual enables me to arrange two rows of tubes in one header which again makes it possible to use the special clamping device for holding the caps covering the ends of the tubes. While I prefer to employ one header for two rows of tubes, I may employ a header for each row or may have several rows in each header. The arrangement of caps secured by only one bolt with an outside clamp obviates the necessity of making two face joints on each cap. On removing the caps the attendant may sight through the tubes or pass a brush through.

The operation of my boiler is as follows:—Through the feed water inlet M' all the water tubes, the headers, the down comers, the combined mud-drum and water jacket are filled with water from the supply tank, not shown, and the combined steam and water drum A is filled to about half its height. The combined pulverizer and blower G is then set in motion by a motor not shown and is supplied with fuel, say soft coal, from a hopper not shown or through the opening $S^4$, and is supplied with air in proper volume for perfect combustion by adjusting the damper $V^2$ in the pipe from the outer air passage surrounding the furnace, or by air from the outside through an intake $S^2$, Figs. 6 and 8. The mingled air and pulverulent fuel are blown through the fuel flue F and injected upward from the bottom of the furnace well toward the top of the combustion chamber C. On entering the combustion chamber when cold, the fuel is ignited by kindling wood or oiled waste or by an ignited oil spray shown in Fig. 7. As the furnace warms up, the igniting pulverulent fuel ignites continuously from the burning pulverulent fuel in the furnace and with further heat, rendering the walls E more or less incandescent, the incoming air and pulverulent material ignite at the mouth of the fuel flue F and fill the combustion chamber with flame. The combining elements pass upward and encounter the water top formed in part by the lower end of the receiving pipe I, are turned downward in mushroom shape and descend along the wall E until they reach the openings from the combustion chamber into the encircling nest of tubes. They then pass upward enveloping the steaming tubes and the down comers, pass over the top of the baffle walls E' and E', down the water tube chamber to the outgoing flues P in contact on the outer side with the wall of the air chamber S.

While the elements of combustion during combustion and the hot gases following complete combustion have an upward and then a downward motion in the combustion chamber, then a second upward and a second downward motion in the water tube spaces, they have also a radial movement from the central zone of fiercest heat through the concentric chambers outward at progressively lower and lower temperatures until they reach the flues P P for outgoing gases.

The water circulation is progressively in the opposite direction from the outer sections to the center. The feed water entering at M' circulates from the bottom of the furnace through the feed water pipe system M M shown in Fig. 3, ascends through pipe connections $b^2$, passes through the economizer element comprising the double outside row of water tubes B' and B', reaches the header H' at the top, passes thence into the header $H^2$, through the passages between them, uniting in the headers $H^2$ with the circulating water from the steam and water drum A, passes downward through the down comer elements $B^2$ $B^2$, reaches the bottom headers $H^4$, from which it passes to the headers $H^5$ and $H^6$, ascending in the two inside double rows of water tubes $B^3$ and $B^3$, which may be called the steaming elements, reaching the top headers $H^3$ and $H^3$ opening one into the other and discharging into the collecting pipes K, six in number, to the receiving pipe I which connects with and forms a part of the steam and water drum A.

It is obvious that steam may be generated in tubes $B^2$ and $B^2$ called the down comer elements, but such steam will be carried with the circulating water to the lower headers $H^5$, from which it will pass upward in the nearest tubes containing water circulating upward, while the water will pass on to the inner header $H^6$, thus insuring full tubes of water at this point where the fiercest heat first strikes the boiler proper.

The receiving pipe I joins the steam and water drum A at a point farthest removed from the steam outlet R, thus giving the longest space and the longest period of travel for steam and water to separate. The circulating water then passes down through the down comers $b$ and repeats its course over and over again, the make up to replace that converted into steam being supplied by the proper amount of incoming feed water through M'. Thus the water circulation upward, then downward, then upward again through the water tubes into the steam and water drum A also progresses from the outer circumference of the boiler as a whole toward the center of the construction where the heat is fiercest. The inner tubes $b^3$ $b^3$, or the Field tubes $B^4$ and $B^4$, depend from the receiving pipe I and contribute to steam production while abstracting heat from hot gases, thus protecting the walls E from fusion and undue waste.

I employ numerous details of construction which contribute greatly to the simplicity, strength and safety, durability and economy of the boiler. For instance, the triple clamp 3, with one staybolt 1, holds three caps 2 covering the tube ends with one clamp and one studbolt, which at the same time acts as a staybolt and strengthens the header, and this also enables me to open up three tubes at a time by unscrewing one nut and removing one clamp.

The arrangement of my water tubes in sections enables me in case of accident to one, as from a shot on a warship, to disconnect, remove and replace the section with very little delay.

By the damper V' I may admit to the blower and pulverizer inert gases in such proportion as to retard the combustion and reduce its intensity within the furnace to any desirable extent.

In Fig. 7 I show a modification of my boiler by making the water jacket D of the fuel flue globular and sufficiently large to nearly fill the ash pit and thereby utilize all the downward radiation from the retort. In Fig. 7 modifications are shown requiring no special description. Feed water is received at the top, the economizer is omitted, the down comers and the steaming elements are connected with the mud-drum through pipe connections L and L forming a water equalizer. It is provided with a manhole and cover affording access to the interior for all purposes, including the expanding of tubes, cleaning and inspection. An outside air jacket S may be used having a downtake S' to the pulverizer and blower G which also may receive air from the outside through S² or combustible gases or other elements through the intake S⁴. In Figs. 6 and 7 flue gases pass out at the top; in Figs. 1 and 8 at the bottom. Fig. 7 also shows an oil tank T and sprayer T² for the initial ignition or for continuous use, spraying in oil alone to ignite the pulverulent fuel at the start, or in combination with pulverulent fuel or otherwise. The innermost free circulation tubes $b^3$ are in Figs. 7 and 8 expanded into the collecting pipes K and K and also into the mud drum D.

Fig. 8 shows a modification specially adapted to marine work in that the furnace wall E² is built slightly flaring and tends to close up chinks and become more compact with the motion of the ship. The innermost tubes connecting the collecting pipes K and K to the mud-drum lined by a wall E² of refractory material form a furnace confining the upward current until it reaches the combustion chamber C, providing a definite path for the incoming fuel and air, the hot gases then radiating out through the tubes descend, enveloping the furnace. The fuel and the supporter of combustion are injected from below upward, continuous ignition being obtained from the heat contained in the surrounding brick work and also from small flaming or incandescent particles of fuel, which having been borne upward with a certain velocity into the burning zone, take fire, but being heavier than the surrounding medium, on losing their inertia, begin to fall back into the incoming stream of fuel and support of combustion, causing the same to become ignited; the descending particles will, however, soon find a point of equilibrium from two causes: First:—the friction of the incoming material will tend to bear them up, as the lower they fall into the hollow cone the greater will this friction become, owing to the reduced area of cross-section of said hollow conical furnace C', the amount of incoming material being virtually constant. The second cause which will operate on the particles of burning fuel tending to maintain them in a certain equilibrium, will be the result of combustion or oxidation, reducing their specific gravity or increasing their relative frictional area sufficiently to enable the friction of the rising material untimately to entirely overcome the action of gravity and so eventually cause them to pass out of the furnace with the other material and products of combustion.

The escaping products of combustion just referred to on leaving the furnace, which they will do with more or less upward velocity, will then pass into what may be termed the mixing or combustion chamber C, in which the complete combustion of what is now practically gas takes place. This action taking place in the presence of the enveloping water surfaces of the boiler, much useful effect is obtained from direct radiation, and especially that from the furnace proper, which is virtually a powerful reflector of search light type, from which the greater portion of the radiation will be concentrated on the central collecting drum and radiating pipes of the boiler. The very small percentage of heat radiated through the lower or smaller opening of the inverted hollow truncated cone furnace will not be lost as it passes directly into the fuel pipe and the incoming materials, serving to heat them up as they enter the furnace.

The products of combustion after entering the combustion chamber pass out radially through the first ring of water tubes, $b^3$ and passing downward enter radially the second pass of the boiler, at the lower end pass out and upward to the top end of the boiler again, and then in some cases are allowed to escape to the stack; but where an economizer is provided or where it may be desirable to deflect them downward a second time, they are again made to radiate outward and pass down and into the flue situated at the bottom of the boiler.

The solid incombustible matter contained in the coal will be largely precipitated at the lower end of the boiler just before entering the second bank of tubes,—an ash pit being provided at this point.

An annular space is provided between the fuel pipe and the equalizer drum on which the base of the furnace rests, to enable any foreign substances or solids to pass into the ash pit and not into the fuel pipe. Any slag that may be formed in the furnace and does not pass out as a vapor with the products of combustion may also escape through this annular space.

Fig. 6 is a modification of the boiler showing a brick dome top to the furnace and Field tubes suspended from the collecting pipes K and K down to the lower end of the furnace.

I may provide spiral deflecting plates W between the economizer tubes, giving a whirling motion to the downward descending current of the escaping gases. They may also be provided in the inner tube space.

It is obvious that I may vary the arrangement of tubes within wide limits without departing from the spirit of my invention. I may decrease the water tubes to one row surrounding the combustion chamber, or I may add to the number indefinitely with or without providing more chambers for the circulation of hot gases.

I may vary the height of the boiler, the shape of the various drums and tubes, may establish water chambers for tubes, may make the cross-section of the boiler and of the constituent tubes circular, triangular, square, many sided, elliptical, or of other shapes in adaptation to the floor space or the duty desired or the convenience of manufacture.

I maintain preferably the principle of a progressive decrease of temperature in the products of combustion from the hottest region within to the surrounding air outside, and the progressive increase of temperature of the circulating water from its lowest temperature to the highest. Or I may, though with less efficiency, depart from this principle and install the water tubes on any desired plan around the combustion chamber, covering the same with the protecting wall of refractory material, or dispensing with it, or providing such walls in part, or in columns, or in only one place in the combustion chamber, or placing the lining of the combustion chamber between the first (innermost) and second rows of tubes.

I find a body of refractory material within the combustion chamber highly advantageous when pulverulent fuel containing little volatile matter is used and no oil or combustible gases are introduced through the fuel flue F, for I find also that this refractory material when incandescent acts to start combustion and render it complete with the minimum supply of air within the limited period available for combustion.

I may use any supporter of combustion with or without commingled inert gases, or commingled or not with combustible gases in the combustion chamber, such as the outcome from the converters in the Bessemer furnace, or the waste products of blast furnaces or of other furnaces where combustion has not been complete.

I may introduce the hot products of combustion from an outside furnace, omitting all combustion within my boiler.

I may have a steam and water drum at the top of the combustion chamber covering the entire top, or of any other shape.

I may use in connection with the boiler any desired economizer.

I may use the boiler for any duty, either stationary or marine or locomotive.

For the uses of the navy, it is especially adapted, not only by reason of its high efficiency, its light weight and relatively small quantity of contained water, but for its capacity for immediate action and forcing without banking fires, and for its smokeless combustion of fuel.

What I claim and desire to secure by Letters Patent is:—

1. In a boiler, the combination of steam and water chambers forming with their connections a combustion chamber closed except at or near the bottom, whereby all the products of combustion double back upon themselves before escaping from the combustion chamber.

2. In a boiler, the combination of steam and water chambers forming with their connections a combustion chamber, closed except at or near the bottom whereby all the products of combustion are caused to double back upon themselves, and an inlet for hot gases located near the bottom of the chamber, substantially as described.

3. In a boiler, a combination of steam and water chambers, forming with their connections a combustion chamber, closed except at or near the bottom whereby all the products of combustion are caused to double back upon themselves, and an inlet for fuel and a supporter of combustion located near the open part of the chamber.

4. In a boiler, a combination of steam and water chambers, forming with their connections a combustion chamber, closed except at or near the bottom whereby all the products of combustion are caused to double back upon themselves, a passage for the products of combustion, an escape for the products of combustion, and an inlet for combustibles located at or near the open part of said combustion chamber.

5. In a boiler, steam and water chambers and baffle walls forming a combustion chamber, inclosed except at the bottom whereby all the products of combustion are caused to double back upon themselves before escaping from the combustion chambers, and steam and feed water connections, substantially as described.

6. In a boiler, water tubes, a steam and water drum, steam and feed water connections forming a combustion chamber, closed except at or near the bottom, a fuel inlet located near the bottom of said combustion chamber, and an inclosing wall, substantially as described.

7. In a boiler, a combination of water chambers and steam and water chambers which with their connections form a combustion chamber, substantially closed except at or near the bottom, a body of refractory material therein, and a fuel inlet located at or near the bottom of said combustion chamber, substantially as described.

8. In a boiler, a combination of water chambers, or steam and water chambers which with their connections form a combustion chamber, closed except at or near the bottom, a lining of refractory material, and a fuel inlet at the bottom of the combustion chamber, substantially as described.

9. In a boiler, up and down tubes, steam and water chambers connected throughout forming a combustion chamber open only at or near the bottom, substantially as described.

10. In a boiler, a steam and water drum, up and down water tubes connected at top and bottom by headers forming a combustion chamber closed except at or near the bottom, and an inlet for fuel located at or near the bottom of said chamber, substantially as described.

11. In a boiler, steam and water chambers forming a combustion chamber, forming also a water channel, a furnace, a lining, and a case forming with the steam and water chambers and their connections, passageways wherein the combustible elements move progressively from the center outward, substantially as described.

12. In a boiler, the combination of water tubes, assembled in removable sections and in rows, the outer row for feed water, the inner row for steam making, a baffle wall between, a furnace wall within, a steam drum, an inclosing case, a fuel inlet, an outlet for flue gases, and steam and feed water connections, substantially as described.

13. In a device of the class described, steam or steam and water chambers forming a combustion chamber closed except at or near the bottom whereby all the products of combustion will double back upon themselves before escaping from the combustion chamber, and means for supplying fuel to the combustion chamber at or near the point where it is open, substantially as described.

14. In a device of the class described, chambers adapted to contain a liquid or a liquid and a gas, said chambers forming a combustion chamber closed except at or near the bottom whereby all the products of combustion will double back upon themselves before escaping from the combustion chamber, and means for supplying fuel to the said combustion chamber at or near the point where it is open.

15. In a device of the class described, a chamber or chambers adapted to contain a liquid or a gas and a liquid, refractory material, said material and chamber forming a combustion chamber closed except at or near the bottom whereby all the products of combustion will double back upon themselves before escaping from the combustion chamber, connections for the first mentioned chamber, and means for supplying fuel to the combustion chamber at or near the bottom of said chamber.

16. In a boiler, the combination of water chambers or steam and water chambers, a combustion chamber of refractory material, the water chambers or steam and water chambers enveloping the combustion chamber and so placed with reference thereto that the water in the water chambers or in the water and steam chambers will cool the refractory material, the combustion chamber being closed except at or near the bottom.

17. In a boiler, steam and water chambers forming a combustion chamber, and also a water channel, the combustion chamber being open at the bottom so that the products of combustion will double back upon themselves before escaping from the combustion chamber, a furnace, a lining, and a casing forming with the steam and water chambers and their connections passageways wherein the combustible elements move progressively from the center outwardly.

18. In a boiler, the combination of steam and water chambers forming with their connections a combustion chamber, an inlet for hot gases, an outlet for cool gases located at or near the bottom of the chamber, said chamber being closed except at or near the bottom, whereby all the products of combustion are caused to double back upon themselves before escaping from the combustion chamber.

19. In a device of the class described, steam or steam and water chambers forming a combustion chamber, said combustion chamber closed except at or near the bottom whereby all the products of combustion are caused to double back upon themselves before escaping from the combustion chamber, means for supplying fuel to the combustion chamber at or near said bottom, and means for conveying away the gases also located at or near the bottom of the chamber, as and for the purpose set forth.

20. In a boiler, the combination of water chambers and steam and water chambers which with their connections form a combustion chamber substantially closed except at or near the bottom whereby all the products of combustion are caused to double back upon themselves before escaping from the combustion chamber, and a fuel inlet located at or near the bottom of said chamber, substantially as described.

In witness whereof, I have hereunto set my hand at the city, county and State of New York, this 13th day of June, 1906.

CLAUDE A. BETTINGTON.

In presence of—
  JOHN J. RANAGAN,
  H. J. LILLIE.